US012513272B1

(12) United States Patent
Timonen et al.

(10) Patent No.: US 12,513,272 B1
(45) Date of Patent: Dec. 30, 2025

(54) CROSSTALK COMPENSATION IN AUTOSTEREOSCOPIC DISPLAYS USING BINOCULAR SUMMATION

(71) Applicant: Distance Technologies Oy, Helsinki (FI)

(72) Inventors: Petteri Timonen, Helsinki (FI); Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/260,790

(22) Filed: Jul. 7, 2025

(51) Int. Cl.
*H04N 13/125* (2018.01)
*H04N 13/302* (2018.01)
*H04N 13/383* (2018.01)

(52) U.S. Cl.
CPC ......... *H04N 13/125* (2018.05); *H04N 13/302* (2018.05); *H04N 13/383* (2018.05)

(58) Field of Classification Search
CPC ... H04N 13/302; H04N 13/125; H04N 13/383
See application file for complete search history.

(56) References Cited

U.S. PATENT DOCUMENTS

| 2019/0281281 A1* | 9/2019 | Miyata | H04N 13/344 |
| 2020/0051320 A1* | 2/2020 | Laffont | G06T 5/70 |
| 2022/0075183 A1* | 3/2022 | Lee | H04N 13/125 |
| 2023/0030931 A1* | 2/2023 | Takahashi | H04N 13/302 |

* cited by examiner

*Primary Examiner* — Zhubing Ren
(74) *Attorney, Agent, or Firm* — Ziegler IP Law Group, LLC

(57) ABSTRACT

A first image and a second image to be directed toward a first eye and a second eye, respectively, are generated or retrieved. For a given first segment of the first image presenting at least a part of a virtual object, an amount of crosstalk toward the first eye is determined based on at least the second image. A given second segment of the second image that also presents at least said part of the virtual object is determined. Intensity values of pixels in the given second segment of the second image are adjusted, based on the amount of crosstalk determined for the given first segment of the first image. An autostereoscopic image is then generated using the first image and the second image, and displayed via an autostereoscopic display.

14 Claims, 2 Drawing Sheets

CROSSTALK COMPENSATION IN AUTOSTEREOSCOPIC DISPLAYS USING BINOCULAR SUMMATION

TECHNICAL FIELD

The present disclosure relates to systems for crosstalk compensation in autostereoscopic displays. The present disclosure also relates to methods for crosstalk compensation in autostereoscopic displays.

BACKGROUND

Autostereoscopic displays enable three-dimensional (3D) viewing experiences without any need for head-worn devices. However, a persistent and well-documented problem in autostereoscopic displays is the phenomenon of crosstalk, that is, leakage of image content intended for one eye into a view of the other eye. Such a visual interference can significantly degrade the 3D effect by introducing ghosting, loss of contrast, and reduced depth resolution, all of which contribute to user discomfort and impair an immersive viewing experience.

The visibility of crosstalk is known to increase with higher image contrast and larger binocular parallax between different images presented to the left eye and the right eye. Therefore, effective crosstalk compensation is critical, particularly in high-contrast or depth-rich scenes common in both virtual and augmented reality contexts.

Conventional crosstalk compensation techniques typically rely on:
  (a) Applying a black level lift to both a left image and a right image to ensure that all crosstalk adjustments remain within a displayable luminance range;
  (b) Estimating an amount of crosstalk being induced from one image into an opposing eye's view; and
  (c) Modifying pixel intensities within a given image segment to locally cancel out the amount of crosstalk.

While these local compensation techniques can mitigate crosstalk to some extent, they suffer from key limitations, particularly when applied to augmented reality (AR) scenarios. In AR use cases, a synthetic light field is optically combined with a real-world light field. Local-only compensation strategies are often inadequate in such settings, as they fail to account for more complex binocular interactions and introduce overly aggressive black level lifts that diminish realism and visual comfort.

There remains a need for improved crosstalk compensation techniques that (i) reduce reliance on heavy black level lifting, (ii) adapt more flexibly to the binocular nature of human vision, and (iii) maintain compatibility with synthetic and real-world scene combinations.

SUMMARY

The present disclosure seeks to provide an improved system and method for crosstalk compensation in an autostereoscopic display. The aim of the present disclosure is achieved by a system and a method in which luminance contributions from both eyes are compensated by adjusting intensity values in at least one of: the first image, the second image, based on binocular summation across different display regions, thereby enhancing the accuracy of perceived brightness and reducing visual artifacts, as defined in the appended independent claims to which reference is made. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
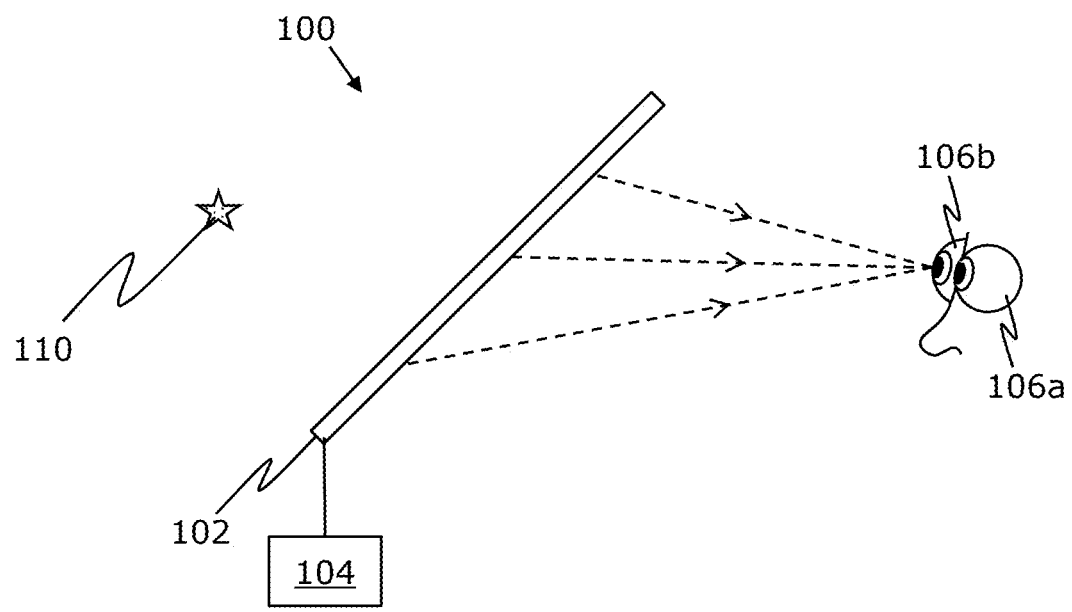
FIGS. 1A and 1B are schematic illustrations of a system for crosstalk compensation, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:
  an autostereoscopic display; and
  at least one processor configured to:
    obtain information indicative of a relative location of a first eye and of a second eye of at least one user with respect to an image plane of the autostereoscopic display;
    generate or retrieve a first image and a second image to be directed toward the first eye and the second eye, respectively, based on the relative location of the first eye and of the second eye with respect to the image plane;
    for a given first segment of the first image presenting at least a part of a virtual object, determine an amount of crosstalk toward the first eye, based on at least the second image;
    determine a given second segment of the second image that also presents at least said part of the virtual object;
    adjust intensity values of pixels in the given second segment of the second image, based on the amount of crosstalk determined for the given first segment of the first image;
    generate an autostereoscopic image using the first image and the second image; and display the autostereoscopic image via the autostereoscopic display.

In a second aspect, an embodiment of the present disclosure provides a method comprising:
  obtaining information indicative of a relative location of a first eye and of a second eye of at least one user with respect to an image plane of an autostereoscopic display;
  generating or retrieving a first image and a second image to be directed toward the first eye and the second eye, respectively, based on the relative location of the first eye and of the second eye with respect to the image plane;

for a given first segment of the first image presenting at least a part of a virtual object, determining an amount of crosstalk toward the first eye, based on at least the second image;

determining a given second segment of the second image that also presents at least said part of the virtual object;

adjusting intensity values of pixels in the given second segment of the second image, based on the amount of crosstalk determined for the given first segment of the first image;

generating an autostereoscopic image using the first image and the second image; and displaying the autostereoscopic image via the autostereoscopic display.

The present disclosure provides the aforementioned system and the aforementioned method for crosstalk compensation in an autostereoscopic display, wherein luminance contributions from both eyes are compensated by adjusting intensity values in at least one of: the first image, the second image, based on binocular summation across different display regions. By determining the given first segment in the first image and the given second segment (namely, a corresponding segment) in the second image that both present at least a part of the same virtual object, and by adjusting the intensity values of the pixels in the given second segment based on the amount of crosstalk determined for the given first segment, the system and method utilize the perceptual phenomenon of binocular summation to improve the accuracy of perceived brightness even in the presence of interocular light leakage. This approach allows for more effective crosstalk suppression without requiring excessive black level lifting or aggressive local intensity adjustments. Moreover, this approach provides an additional degree of freedom compared to the prior art, where intensity values within a single display region are adjusted locally. By recognizing that the user's eyes typically do not converge on a same display region in depth-rich scenes, the system and method allow cross-region compensation, thereby achieving superior perceptual fidelity and flexibility in managing crosstalk artifacts. This enables high-quality and high-contrast autostereoscopic image presentation with reduced ghosting artifacts and improved depth fidelity, thereby enhancing the realism and user comfort of the 3D viewing experience. Notably, the crosstalk compensation so achieved is inherently stable and non-recursive. Because adjustments to the intensity values of the pixels are made to perceptually balance binocular luminance, they typically reduce emitted light or redistribute it conservatively. As a result, the adjustments do not exacerbate or propagate crosstalk across other segments. This bounded behaviour ensures predictability, simplifies implementation, and avoids runaway artifacts that would otherwise necessitate complex iterative solutions. Furthermore, the system and method are computationally efficient, scalable to multiscopic implementations, and suitable for real-time operation.

It will be appreciated that, in a case of a vehicle where the system is implemented as a heads-up display (HUD), the autostereoscopic display may be implemented as a transparent display that is integrated into a windshield of the vehicle, or as a non-transparent display that is employed with an optical combiner integrated into the windshield. One example of such a transparent display has been described in U.S. patent application Ser. No. 18/818,717, titled "Augmenting Reality with Multiscopic See-through Display", which is incorporated herein by reference. Moreover, the system is susceptible to be utilised for other use cases (for example, such as digital signage in retail stores, museums, and public spaces) as well.

Pursuant to embodiments of the present disclosure, the amount of crosstalk toward the first eye for the given first segment of the first image arises due to at least the second image (which is presented simultaneously with the first image during display of the autostereoscopic image). By "at least", it is meant that the amount of crosstalk toward the first eye of a given user arises due to the second image for the second eye of the given user, but may additionally arise due to one or more pairs of first images and second images for one or more other users (namely, in a case where the at least one user comprises a plurality of users).

In this regard, the amount of crosstalk toward the first eye can be determined by taking into account actual intensity values of the pixels in the second image. The amount of crosstalk can be determined using any suitable well-known technique. As an example, the autostereoscopic display and a multiscopic optical element thereof (for example, such as a lenticular array, a parallax barrier, or similar) can be pre-analysed (for example, during calibration) using specialised equipment to determine the amount of crosstalk. The specialised equipment could comprise at least one of: a high-resolution camera, a photometer, a spectroradiometer, a luminance meter, an electro-optical sensor.

Additionally or alternatively, specialised software algorithms can be utilised to determine the amount of crosstalk based on known parameters of the autostereoscopic display and the multiscopic optical element. These parameters may comprise at least one of: a pixel size of the autostereoscopic display, a pitch of the multiscopic optical element, a relative spatial alignment between pixels and multiscopic cells (for example, transparent portions or lenticules) in the multiscopic optical element. The aforesaid specialised equipment and specialised software algorithms are well-known in the art.

For illustration purposes only, there will now be described a well-known technique for determining the amount of crosstalk toward the first eye. Light intensities visible to the first eye may be measured using any of the aforesaid specialised equipment. The equipment can be positioned at a viewpoint of the first eye to allow for accurate capture of the light intensities. Moreover, this technique can be extrapolated and utilised for each eye of each user in case of multiple users in a similar manner.

Case 1: A white image is utilised as the first image, while a black image is utilised as the second image. First light intensities "F" are measured when the first image and the second image are presented during display of a corresponding autostereoscopic image (generated using the first image and the second image). The first light intensities "F" correspond to a maximum possible intensity that can be perceived by the first eye. The white image can be an image whose pixels are white or near white, wherein "near white" pixels have intensity values within a predefined percent from a full intensity. Likewise, the black image can be an image whose pixels are black or near black, wherein "near black" pixels have intensity values within a predefined percent from a zero intensity. As an example, the predefined percent may lie in a range of 1 to 5 percent.

Case 2: A black image is utilised as the first image, while a white image is utilised as the second image. Second light intensities "S" are measured under these conditions. Ideally, no light should reach the first eye.

However, the second light intensities "S" correspond to some light that arises due to:
(a) light leakage (namely, crosstalk) from the second image to the first eye; and
(b) light from an imperfect black of the pixels of the first image.

Case 3: Black images are utilised as the first image and the second image. Third light intensities "T" are measured under these conditions. The third light intensities "T" correspond solely to residual light from an imperfect black level of the first image.

Now, the amount of crosstalk toward the first eye can be calculated as follows:

$$\text{Crosstalk} = ((S-T)/(F-T)) \times 100$$

Herein, the numerator (S−T) represents the amount of the light leakage (namely, the crosstalk) from the second image toward the first eye, because the third light intensities "T" (corresponding to only the light from the imperfect black of the pixels of the first image) are subtracted from the second light intensities "S". The denominator (F−T) represents an actual maximum intensity possible toward the first eye, as the third light intensities "T" are subtracted from the first light intensities "F".

It will be appreciated that the crosstalk may be expressed as a percentage, as described above, or directly in terms of units of the intensity values. Either form may be used to make adjustments to the intensity values of the pixels in the given second segment of the second image, in accordance with embodiments of the present disclosure.

Optionally, the intensity values of the pixels in the given second segment of the second image are adjusted separately for each sub-pixel (namely, for each colour component of the pixels). A technical benefit of adjusting the intensity values separately for each sub-pixel is that it allows for a granular control of the crosstalk compensation, thereby improving a colour reproduction of the 3D visual scene. Optionally, in this regard, the amount of crosstalk is determined at a sub-pixel level. In other words, the amount of crosstalk that is to be taken into account (when adjusting the intensity values of the pixels) is also considered separately for each sub-pixel. As an example, if the amount of crosstalk determined for the given first segment of the first image indicates a relatively greener colour (that may be arising due to at least the second image), the intensity values of the pixels in the given second segment of the second image can be adjusted such that a relatively larger amount of crosstalk is subtracted from green sub-pixels as compared to other sub-pixels of the pixels in the given second segment of the second image.

Moreover, optionally, the at least one processor is configured to apply a black level lift to the second image prior to adjusting the intensity values of the pixels in the given second segment of the second image. The phrase "applying the black level lift" refers to a process in which a minimum intensity level (that is, a black point) of pixels in the second image or a given segment of the second image are increased. In other words, when the black level lift is applied, a lowest level of the intensity values of the pixels is increased.

Applying a black level lift to the second image prior to adjusting the intensity values of the pixels in the given second segment of the second image provides several technical benefits. First, it ensures that adjustments in the intensity values of the pixels in the given second segment (that are made in response to the amount of crosstalk determined for the given first segment of the first image) do not result in the intensity values falling below a minimum representable luminance of the autostereoscopic display. This allows for accurate compensation even when the second image already contains low intensity values. Second, the black level lift increases an effective dynamic range available for the crosstalk compensation within the second image, thereby enabling more precise control of contrast and brightness during crosstalk compensation. Third, by applying the black level lift before any adjustment, perceptual consistency across the second image is maintained, and artifacts such as patchy darkening or abrupt black clipping are reduced. As a result, the overall visual quality of the autostereoscopic image is improved, especially in scenes containing dark or shadowed regions. Moreover, applying the black level lift in this manner supports implementations where the crosstalk compensation is applied uniformly across different segments, without requiring any conditional checks on the minimum intensity level for each individual pixel.

Optionally, the black level lift is applied on a per-segment basis, wherein a segment of the second image to which the black level lift is applied includes and surrounds the given second segment. In other words, an amount of the black level lift (namely, an amount by which the minimum intensity level of the pixels is increased) can be different for different segments of the second image. It will be appreciated that a size of each of these segments of the second image is much larger than just a single pixel. This allows the at least one user to have a point of comparison for the darkest colour in the second image, namely for what "black" is in the second image. Consequently, this allows to compensate for the crosstalk appropriately, such that ghosting artefacts are reduced and possibly minimised.

By applying the black level lift on a per-segment basis, the crosstalk compensation can be localised to a segment near the user's gaze or point of interest, without altering a global contrast profile of an entirety of the second image. This allows compensation to remain perceptually subtle and unobtrusive while targeting the segments where ghosting is most likely to be noticed.

Additionally, optionally, the amount of the black level lift is varied across neighbouring segments of the second image gradually. In other words, the amount of the black level lift is not varied drastically across the neighbouring segments. Segment-wise black level lift, when applied gradually across neighbouring segments, helps avoid sudden brightness transitions at segment boundaries. This ensures that even in dynamic scenes or during user head or eye movement, a compensated output remains visually continuous and free from flicker or striping artifacts that might otherwise arise from abrupt differences in black level offsets. By "gradually" herein, it is meant that the amount of the black level lift is not changed by more than a predefined percent (of said amount) across the neighbouring segments. The predefined percent may, for example, lie in a range of 2 to 10 percent.

Optionally, the amount of the black level lift can be determined based on whether the amount of crosstalk determined for the given first segment of the first image is smaller than a predefined threshold amount. In other words, if the amount of crosstalk for the given first segment of the first image is almost negligible, the applying of the black level lift may be skipped completely or attenuated. In this regard, the predefined threshold amount depends on a dynamic range of colours in the second image. As an example, for an 8 bit-representation (which allows for intensity values ranging from 0 to 255 units), the predefined threshold amount may lie in a range of 1 to 10 units.

Additionally, optionally, the amount of the black level lift can be determined based further on whether the intensity values of the pixels in the given second segment of the second image is higher than the amount of crosstalk determined for the given first segment of the first image. Thus, there may be at least one segment of the second image for which the applying of the black level lift can be skipped completely, or the amount of the black level lift can be kept smaller.

Furthermore, in some implementations, the crosstalk compensation can be performed in a similar manner for the given second segment of the second image as well. Optionally, in this regard, the at least one processor is configured to:

for the given second segment of the second image presenting at least said part of the virtual object, determine an amount of crosstalk toward the second eye, based on at least the first image; and adjust intensity values of pixels in the given first segment of the first image, based on the amount of crosstalk determined for the given second segment of the second image.

Such a bidirectional compensation provides several technical benefits. First, it enables a more balanced correction, particularly in scenarios where the leakage is not symmetric. For instance, the crosstalk from the second image to the first eye might differ in magnitude or colour spectrum as compared to the crosstalk from the first image to the second eye, depending on one or more of: the multiscopic optical element and other optics (for example, such as an optical combiner), nonuniformities in a light-emitting panel of the autostereoscopic display, or viewing geometry. Jointly adjusting both the first image and the second image can help converge the perceived binocular luminance more precisely toward an intended luminance of the virtual object.

Second, it can improve robustness in multi-user scenarios and/or depth-rich scenes. When the user's eyes perceive the same virtual object through different regions (especially at large disparities), the leakage patterns can be complex. Bidirectional compensation may help manage such cases, where both segments contribute non-negligibly to the perceived result.

Third, it further reduces ghosting artifacts. If either eye sees more ghosting than the other (due to asymmetric leakage or intensity distributions), unidirectional compensation might not be sufficient. Jointly adjusting both the first image and the second image allows for finer control of the binocular brightness, thereby reducing ghosting and improving visual quality.

In other implementations, the crosstalk compensation can be performed in a different manner for the given second segment of the second image. In such implementations, the crosstalk may be compensated for the given second segment of the second image in a conventional manner (namely, using a conventional technique). Optionally, in this regard, the at least one processor is configured to:

for the given second segment of the second image presenting at least said part of the virtual object, determine an amount of crosstalk toward the second eye, based on at least the first image; and adjust the intensity values of the pixels in the given second segment of the second image, based further on the amount of crosstalk determined for the given second segment of the second image.

Such a selective compensation may be potentially beneficial in a case where the first eye is the dominant eye of the user. Adjusting the intensity values of the pixels only in the given second segment of the second image allows to present the first image without any major adjustments, thereby preserving its original visual characteristics. This may enhance a viewing experience of the user.

Additionally, such a selective compensation approach can reduce computational load, which may be particularly useful in latency-sensitive or resource-constrained implementations. Moreover, by preserving the fidelity of the first image, it is ensured that any critical visual content presented toward the first eye (namely, the dominant eye) remains unaffected. The approach also enables user-specific adaptability, such as tailoring compensation behaviour based on known dominant-eye preferences or viewer sensitivity.

Irrespective of whether the crosstalk compensation is applied in any one of:

a unidirectional manner (namely, adjusting only the second image based on the crosstalk determined for the first image), a bidirectional manner (namely, additionally adjusting the first image based on the crosstalk determined for the second image), or a selective manner (namely, adjusting only the second image based on the crosstalk determined for the first image and the second image), the crosstalk determined for the given first segment of the first image can additionally be compensated locally at the given first segment. Optionally, in this regard, the at least one processor is configured to:

apply a black level lift to at least the given first segment of the first image; and adjust intensity values of pixels in the given first segment of the first image, in addition to adjusting the intensity values of the pixels in the given second segment of the second image, based on the amount of crosstalk determined for the given first segment of the first image.

By "at least", it is meant that the black level lift can be applied either globally to an entirety of the first image, or on a per-segment basis. In case of per-segment black level lift, a segment of the first image to which the black level lift is applied could include and surround the given first segment.

Such a local crosstalk compensation in the given first segment of the first image provides additional technical advantages. First, it increases a headroom for performing crosstalk compensation in cases where the amount of crosstalk determined for the given first segment of the first image exceeds a compensable range of the second image alone. Second, it allows for finer control of luminance balancing between both eyes, particularly in scenes where both images contribute significantly to the perception of the same virtual object. Third, it helps avoid perceptual imbalances by distributing crosstalk compensation across both images, thereby maintaining the visual integrity of the first image without relying solely on heavy correction through the second image. Fourth, when the black level lift is applied on a per-segment basis, the compensation remains localized to a relevant region, thus minimizing impact on the overall appearance of the first image.

Moreover, optionally, the system further comprises a tracker. The tracker may be used to obtain the information indicative of the relative location of the first eye and of the second eye of the at least one user with respect to the image plane. Additionally, optionally, the at least one processor is configured to:

determine a gaze direction of the first eye, using the tracker; and select the given first segment of the first image, based on the gaze direction of the first eye.

Selecting the given first segment of the first image based on the gaze direction of the first eye provides several technical benefits, particularly in scenarios involving dynamic content and head movement, where gaze-contingent crosstalk compensation ensures that mitigation is focused on segments most critical to the user's visual experience. First, it reduces the overall computational burden by limiting crosstalk compensation to gaze-relevant segments, thereby conserving processing resources. Second, it improves real-time responsiveness by prioritising updates to those segments that are actively within the user's visual attention. Third, it avoids perceptual overcorrection in peripheral regions of the first image, where minor crosstalk may be tolerable or go unnoticed. Fourth, in hardware implementations, such a gaze-contingent strategy supports energy-efficient operation by reducing the number of segments requiring active crosstalk compensation, which is especially advantageous in power-constrained or embedded systems. Fifth, in cases where the first eye is the dominant eye of the user, prioritising crosstalk compensation based on the gaze direction of the first eye ensures that visual fidelity is maximised for the eye contributing most to depth perception and image clarity, thereby enhancing the overall quality of the autostereoscopic experience.

There will now be illustrated how binocular summation can be utilised to perform the crosstalk compensation more accurately. It will be appreciated that for depth perception, the aforesaid part of the virtual object is presented using different display regions of the autostereoscopic image for different eyes of the at least one user. In other words, a first display region and a second display region of the autostereoscopic display are employed to emit light corresponding to the given first segment of the first image toward the first eye and to emit light corresponding to the given second segment of the second image toward the second eye, respectively. Optionally, the intensity values of the pixels in the given second segment of the second image are adjusted such that a binocular sum of:

(i) a luminance of the light emitted from the first segment toward the first eye,
(ii) a luminance of the light emitted from the second segment toward the second eye, and
(iii) a luminance of the crosstalk toward the first eye,
lies within a predefined threshold range of a target binocular luminance corresponding to said part of the virtual object.

Pursuant to embodiments of the present disclosure, the target binocular luminance corresponding to said part of the virtual object is a predefined value that represents an intended perceptual luminance when said part of the virtual object is viewed binocularly by the at least one user. In some implementations, the target binocular luminance is derived from a rendering pipeline employed by a rendering engine. In such implementations, the target binocular luminance is assigned to said part of the virtual object based on at least one of: a lighting model selected for an ambient surrounding, surface reflectance parameters of the virtual object, a virtual scene in which the virtual object is being presented. For example, when the virtual object is rendered in a 3D environment, a luminance computed by a shader (for example, using a Lambertian or Phong model, or similar) is used as the target binocular luminance. Additionally, the target binocular luminance may be adjusted slightly in runtime based on scene-specific lighting conditions or ambient illumination if an ambient light sensor and/or a real-world-facing camera is available.

The predefined threshold range may be set based on at least one of:
Just Noticeable Difference (JND) thresholds in human vision, such that deviations are not perceptually significant;
bit-depth constraints of the autostereoscopic display (for example, 1 to 5 units for 8-bit representation);
tolerance limits derived during calibration or perceptual testing.

Utilising binocular summation to constrain the adjustment of the intensity values based on the target binocular luminance provides several technical benefits. First, it enables perceptually accurate crosstalk compensation by aligning the combined luminance perceived by the user (that is, the binocular sum of the luminance of the light emitted from both display regions along with the crosstalk) against the target binocular luminance, thereby avoiding over- or undercompensation that may occur when images are adjusted independently.

Second, it ensures consistency in luminance reproduction across varying display regions, virtual scenes, and user conditions, while preserving depth cues and intended luminance of the virtual object. This enables compensation that is both deterministic and perceptually balanced, even across non-uniform or multi-user setups.

Third, by explicitly including the luminance of the crosstalk in the binocular sum, the system adopts a physically grounded correction model that is more robust across varying display hardware, optical misalignments, and viewer-specific differences (such as interpupillary distance or eye position).

Fourth, this formulation supports selective intensity adjustments that minimise perceptual distortion, for example, by maintaining stability in the first image when the first eye is dominant, while applying more aggressive compensation through the second image.

Fifth, it enables quantitative calibration of compensation parameters within the predefined threshold range of the target binocular luminance, supporting consistent perceptual outcomes across varying content and ambient lighting conditions.

Sixth, it provides greater resilience to temporal inconsistencies, thereby minimising flicker or luminance pulsing during head movement or scene transitions where different segments are dynamically reassigned to the same virtual object.

Seventh, because the target binocular luminance and the predefined threshold range are explicitly defined and measurable, this approach supports objective calibration, validation, and quality control using tools such as photometers or cameras, reducing the need for heuristic tuning during deployment.

Moreover, optionally, the binocular sum ($L_{binocular}$) is calculated using an expression:

$$L_{binocular} = \frac{L_{first}^2 + L_{second}^2}{L_{first} + L_{second}},$$

wherein:
$L_{first}$ denotes a sum of (i) the luminance of the light emitted from the first segment toward the first eye and (iii) the luminance of the crosstalk toward the first eye, and
$L_{second}$ denotes (ii) the luminance of the light emitted from the second segment toward the second eye.

The aforementioned expression is also known as Schrödinger's equation in the context of binocular brightness perception. Hereinabove, $L_{first}$ can be implemented as a linear sum of (i) the luminance of the light emitted from the first segment toward the first eye and (iii) the luminance of the crosstalk toward the first eye. It will be appreciated that a person skilled in the art will recognize many variations, alternatives, and modifications of the aforesaid expression.

Employing the Schrödinger's equation to calculate the binocular sum when adjusting the intensity values provides several technical benefits. First, it defines the binocular sum as a mathematical combination of the intended emissions (for both the first eye and the second eye) and the interocular leakage, ensuring a perceptually accurate representation of binocular luminance received by the user's retinas. This allows the crosstalk compensation to be directly aligned with the actual visual input perceived by the user.

Second, the use of an explicit and closed-form expression enables the binocular sum to be calculated using standard arithmetic operations, simplifying implementation in both software shaders and embedded processors. This supports real-time and scalable rendering architectures.

Third, by factoring in the crosstalk explicitly within $L_{first}$, the crosstalk compensation can be prioritized asymmetrically, such that the intensity values in the second image are adjusted more aggressively, especially if the first eye is dominant. This enables perceptual optimization strategies that preserve luminance fidelity in critical segments.

Fourth, the use of Schrödinger's equation is consistent with established psychophysical models of binocular luminance perception, making the compensation approach compatible with standardized perceptual evaluation protocols in vision science.

Fifth, as the aforesaid expression isolates luminance contributions from each image segment and each optical path, it is highly adaptable to heterogeneous display architectures, for example, such as multiscopic displays or transparent overlays, where crosstalk patterns may vary asymmetrically.

Sixth, crosstalk compensation performed based on such mathematically calculated binocular sum remains predictable and analytically tractable, making it well-suited for optimization-based or machine-learned rendering pipelines where stable gradients are required for convergence.

Furthermore, in some implementations, the perceptual characteristics of the Schrödinger's equation allow the crosstalk compensation to be non-monotonic. That is, instead of reducing light emission to mitigate ghosting, it may be perceptually beneficial to increase the luminance of the given second segment of the second image. This counterintuitive adjustment leverages the human visual system's binocular integration behaviour, whereby binocular luminance can be balanced not only by dimming leaked light but also by enhancing compensatory light directed toward the non-dominant eye.

As an example, keeping $L_{first}$ fixed, if $L_{second}$ is increased, the binocular sum might increase or decrease depending on a ratio between $L_{first}$ and $L_{second}$. This means that it is possible to reduce the perceived binocular luminance (i.e., make a region appear darker) by increasing the luminance toward the second eye, because of the non-linear nature of the equation.

As a result, this strategy may help preserve contrast and brightness in perceptually critical image segments, reduce visual discomfort due to excessive darkening, and lessen the reliance on aggressive black level lifting in the second image.

For illustration purposes only, there will now be described how various components of the system can be implemented. The at least one processor controls an overall operation of the system. The at least one processor is communicably coupled to the autostereoscopic display and optionally, to the tracker. Optionally, the at least one processor is implemented as a processor of the autostereoscopic display. Alternatively, optionally, the at least one processor is implemented as a processor of a computing device that is communicably coupled to the autostereoscopic display. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Throughout the present disclosure, the term "tracker" refers to a specialised equipment for detecting and/or tracking a location of eyes of a given user. In some implementations, the tracker is also used for detecting gaze directions of the user's eyes. Optionally, the tracker is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (namely, the at least one visible-light camera, the at least one IR camera, the at least one depth camera) may be utilised in the tracker. When different types of images captured by the various different types of tracking cameras are utilised, the location of the user's eyes can be determined highly accurately, as results obtained from one type of image can be used to refine results obtained from another type of image. Herein, these different types of images constitute the tracking data collected by the tracker, and may be in the form of at least one of: visible-light images, IR images, depth images. It will be appreciated that the tracker tracks both eyes of the at least one user with a significantly high accuracy and precision, such that an error in determining the relative location may, for example, be minimised to within a tolerance range of approximately (+/−) 8 millimetres.

It will be appreciated that the tracker is employed only optionally in the system. In some cases, the relative locations of the eyes of the at least one user may be fixed or pre-known. In such cases, the information indicative of the relative location of the first eye and of the second eye of the at least one user with respect to the image plane can be obtained, for example, by retrieving from a data repository.

The given second segment of the second image (that also presents at least the part of the virtual object) can be determined using various approaches. As an example, the given second segment can be determined based on a stereo convergence of the gaze directions of the first eye and the second eye. As another example, the given second segment can be determined based on the relative location of the second eye with respect to the image plane, and depth information associated with the virtual object.

The image plane can be a light-emitting surface of the autostereoscopic display in a case where the autostereoscopic display is being directly viewed. Alternatively, the image plane can be an imaginary plane in another case where an optical combiner is employed to facilitate a reflected view. In such cases, the optical combiner is arranged on an optical path of the autostereoscopic display and an optical path of a real-world light field of a real-world environment. In each of these cases, the term "image plane" refers to an intended location in space where the virtual object is perceived. This does not require the autostereoscopic display or other optical elements on the optical path to be physically planar. This definition applies irrespective of the optical configuration of the system, namely:
  (i) in a case where a distorted image is displayed on a curved or non-curved display and reflected through a curved combiner,
  (ii) in a case where an undistorted image is displayed on a non-curved display and reflected through a non-curved combiner,
  (iii) in a case where an image is displayed on the autostereoscopic display and viewed directly (without any optical combiner).

Pursuant to embodiments of the present disclosure, different types of autostereoscopic displays can be implemented. For example, the autostereoscopic display can be any one of: hogel-based, lenticular array-based, parallax barrier-based. Depending on the type of the autostereoscopic display, the multiscopic optical element can be a lenticular array, a parallax barrier, or similar. Optionally, the at least one processor is configured to control the multiscopic optical element, based on the relative location of the first eye and of the second eye of the at least one user with respect to the image plane, to direct light produced by a first set of pixels of the autostereoscopic image toward the first eye, whilst directing light produced by a second set of pixels of the autostereoscopic image toward the second eye.

The first image and the second image can be retrieved based on the relative locations of the first eye and the second eye of the at least one user. In a case where the at least one user comprises a plurality of users, there would be a corresponding pair of a first image and a second image for each of the plurality of users. The autostereoscopic image may be understood to be a two-dimensional (2D) image comprising a plurality of pixels, wherein the first set of pixels from amongst the plurality of pixels is responsible for generating a first part of a synthetic light field that corresponds to the first eye, and the second set of pixels from amongst the plurality of pixels is responsible for generating a second part of the synthetic light field that corresponds to the second eye. It will be appreciated that the pixels belonging to the first set are not arranged in a continuous manner across the autostereoscopic image; similarly, the pixels belonging to the second set are also not arranged in a continuous manner across the autostereoscopic image. Optionally, the pixels belonging to the first set and the pixels belonging to the second set are arranged in alternating vertical stripes across a horizontal field of view of the autostereoscopic image, wherein each vertical stripe comprises one or more lines of pixels. This is because humans perceive depth mainly based on horizontal binocular parallax. Thus, in this way, the autostereoscopic image would be considerably different as compared to a conventional 2D image that is displayed via conventional 2D displays, because the same autostereoscopic image comprises visual information corresponding to the first eye as well as the second eye of the at least one user.

In some implementations, the virtual object is a part of a virtual environment. Optionally, in such implementations, the at least one processor is configured to generate the first image and the second image from a perspective of the relative location of the first eye and the second eye of the at least one user with respect to the image plane, by employing a 3D model of the virtual environment. The term "virtual object" refers to a computer-generated object (namely, a digital object). Examples of the virtual object may include, but are not limited to, a virtual navigation tool, a virtual gadget, a virtual message, a virtual entity, a virtual entertainment media, a virtual vehicle or part thereof, and a virtual information. The term "three-dimensional model" of the virtual environment refers to a data structure that comprises comprehensive information pertaining to the virtual object. Such a comprehensive information is indicative of at least one of: a plurality of features of the virtual object or its portions, a shape and a size of the virtual object or its portions, a pose of the virtual object or its portions, a material of the virtual object or its portions, a colour and an optical depth of the virtual object or its portions. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to generate the first image and the second image to be presented to the first eye and the second eye of the at least one user in a form of 2D user interface (UI) elements. The 2D UI elements could pertain to, for example, a virtual navigation tool, a virtual gadget, a virtual message, a virtual entity, a virtual entertainment media, a virtual information, or similar.

The present disclosure also relates to the method as described above. Various embodiments and variants disclosed above, with respect to the aforementioned first aspect, apply mutatis mutandis to the method.

In some implementations, a first display region and a second display region of the autostereoscopic display are employed to emit light corresponding to the given first segment of the first image toward the first eye and to emit light corresponding to the given second segment of the second image toward the second eye, respectively. Optionally, the intensity values of the pixels in the given second segment of the second image are adjusted such that a binocular sum of:
  (i) a luminance of the light emitted from the first segment toward the first eye,
  (ii) a luminance of the light emitted from the second segment toward the second eye, and
  (iii) a luminance of the crosstalk toward the first eye, lies within a predefined threshold range of a target binocular luminance corresponding to said part of the virtual object.

This provides a perceptually-grounded, deterministic way to balance compensation adjustments and ensures consistency across varying display regions, virtual scenes and user conditions, while preserving the depth cues and brightness intended for the virtual object.

Optionally, in this regard, the binocular sum ($L_{binocular}$) is calculated using an expression:

$$L_{binocular} = \frac{L_{first}^2 + L_{second}^2}{L_{first} + L_{second}},$$

wherein:

$L_{first}$ denotes a sum of (i) the luminance of the light emitted from the first segment toward the first eye and (iii) the luminance of the crosstalk toward the first eye, and $L_{second}$ denotes (ii) the luminance of the light emitted from the second segment toward the second eye.

Employing the Schrödinger's equation to calculate the binocular sum when adjusting the intensity values provides several technical benefits, as described earlier.

Moreover, optionally, the method further comprises applying a black level lift to the second image prior to adjusting the intensity values of the pixels in the given second segment of the second image. Applying a black level lift to the second image prior to adjusting the intensity values of the pixels in the given second segment of the second image provides several technical benefits, as described earlier.

Optionally, in this regard, the black level lift is applied on a per-segment basis, wherein a segment of the second image to which the black level lift is applied includes and surrounds the given second segment. By applying the black level lift on a per-segment basis, the crosstalk compensation can be localised to a segment near the user's gaze or point of interest, without altering a global contrast profile of an entirety of the second image.

Optionally, the method further comprises:
determining a gaze direction of the first eye, using a tracker; and
selecting the given first segment of the first image, based on the gaze direction of the first eye.

Selecting the given first segment of the first image based on the gaze direction of the first eye provides several technical benefits, particularly in scenarios involving dynamic content and head movement, where gaze-contingent crosstalk compensation ensures that mitigation is focused on segments most critical to the user's visual experience, as described earlier.

In some implementations, the crosstalk compensation can be performed in a bidirectional manner. Optionally, in this regard, the at least one processor is configured to:
for the given second segment of the second image presenting at least said part of the virtual object, determine an amount of crosstalk toward the second eye, based on at least the first image;
adjust intensity values of pixels in the given first segment of the first image, based on the amount of crosstalk determined for the given second segment of the second image.

Such a bidirectional compensation provides several technical benefits, as described earlier.

In other implementations, the crosstalk compensation can be performed in a selective manner. Optionally, in this regard, the at least one processor is configured to:
for the given second segment of the second image presenting at least said part of the virtual object, determine an amount of crosstalk toward the second eye, based on at least the first image; and
adjust the intensity values of the pixels in the given second segment of the second image, based further on the amount of crosstalk determined for the given second segment of the second image.

Such a selective compensation may be potentially beneficial, for example, in a case where the first eye is the dominant eye of the user, as described earlier.

Irrespective of whether the crosstalk compensation is applied in any one of:
a unidirectional manner (namely, adjusting only the second image based on the crosstalk determined for the first image),
a bidirectional manner (namely, additionally adjusting the first image based on the crosstalk determined for the second image), or
a selective manner (namely, adjusting only the second image based on the crosstalk determined for the first image and the second image),
the crosstalk determined for the given first segment of the first image can additionally be compensated locally at the given first segment. Optionally, in this regard, the method further comprises:
applying a black level lift to at least the given first segment of the first image; and
adjusting intensity values of pixels in the given first segment of the first image, in addition to adjusting the intensity values of the pixels in the given second segment of the second image, based on the amount of crosstalk determined for the given first segment of the first image.

Such a distributed manner of crosstalk compensation provides several benefits, as described earlier.

DETAILED DESCRIPTION OF THE DRAWINGS

Figure 1B:
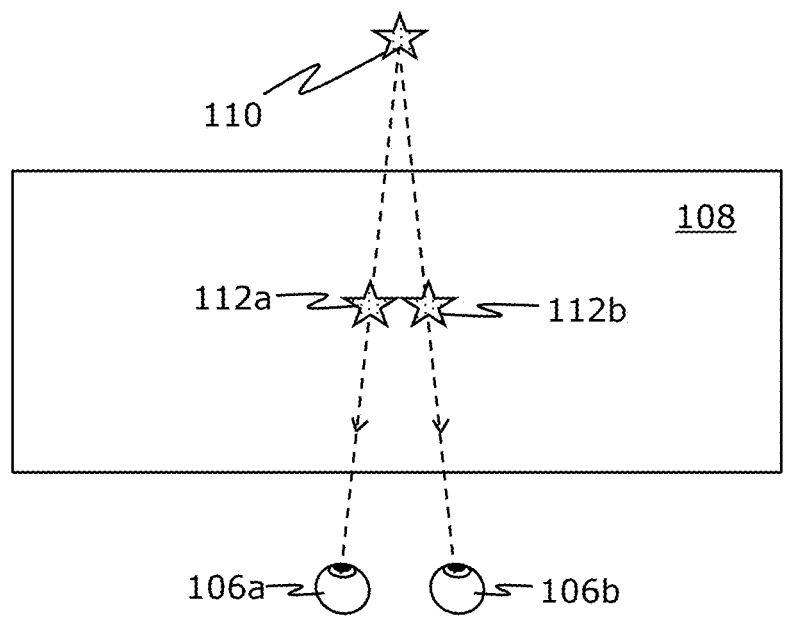

FIGS. 1A and 1B are schematic illustrations of a system 100 for crosstalk compensation, in accordance with an embodiment of the present disclosure. The system 100 comprises an autostereoscopic display 102 and at least one processor depicted as a processor 104. The processor 104 is configured to:
obtain information indicative of a relative location of a first eye 106a and of a second eye 106b of at least one user with respect to an image plane 108 of the autostereoscopic display 102;
generate or retrieve a first image and a second image to be directed toward the first eye 106a and the second eye 106b, respectively, based on the relative location of the first eye 106a and of the second eye 106b with respect to the image plane 108;
for a given first segment of the first image presenting at least a part of a virtual object 110, determine an amount of crosstalk toward the first eye 106a, based on at least the second image;
determine a given second segment of the second image that also presents at least said part of the virtual object 110;
adjust intensity values of pixels in the given second segment of the second image, based on the amount of crosstalk determined for the given first segment of the first image;
generate an autostereoscopic image using the first image and the second image; and display the autostereoscopic image via the autostereoscopic display 102.

As shown in FIG. 1B, the given first segment and the given second segment are displayed at a first portion 112a and a second portion 112b of the image plane 108, respectively, which correspond to a first display region and a second display region of the autostereoscopic display 102.

It may be understood by a person skilled in the art that FIGS. 1A and 1B include a simplified example implementation of the system 100, for sake of clarity, which should not unduly limit the scope of the claims herein. It is to be understood that a specific implementation of the system 100 is not to be construed as limiting it to specific numbers or types of autostereoscopic displays and processors. A person skilled in the art will recognize many variations, alternatives, and modifications of embodiments of the present disclosure. For example, the autostereoscopic display may be reflectively viewed via an optical combiner in some implementations.

Figure 2:
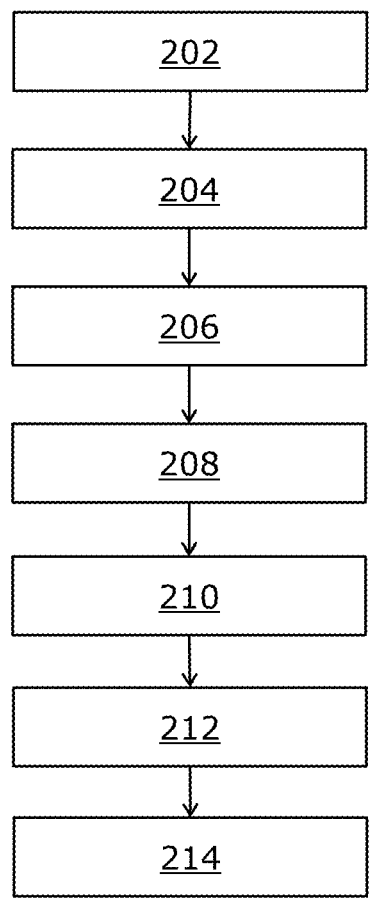
FIG. 2 illustrates steps of a method for crosstalk compensation, in accordance with an embodiment of the present disclosure.

Referring to FIG. 2, illustrated are steps of a method for crosstalk compensation, in accordance with an embodiment of the present disclosure. At step 202, information indicative of a relative location of a first eye and of a second eye of at least one user with respect to an image plane of the autostereoscopic display is obtained. At step 204, a first image and a second image to be directed toward the first eye and the second eye are generated or retrieved, respectively, based on the relative location of the first eye and of the second eye with respect to the image plane. At step 206, for a given first segment of the first image presenting at least a part of a virtual object, an amount of crosstalk toward the first eye is determined, based on at least the second image. At step 208, a given second segment of the second image that also presents at least said part of the virtual object is determined. At step 210, intensity values of pixels in the given second segment of the second image are adjusted, based on the amount of crosstalk determined for the given first segment of the first image. At step 212, an autostereoscopic image is generated using the first image and the second image. At step 214, the autostereoscopic image is displayed via the autostereoscopic display.

The aforementioned steps are only illustrative and other alternatives can also be provided where one or more steps are added, or one or more steps are provided in a different sequence without departing from the scope of the claims herein.

The invention claimed is:

1. A system comprising:
an autostereoscopic display; and
at least one processor configured to:
obtain information indicative of a relative location of a first eye and of a second eye of at least one user with respect to an image plane of the autostereoscopic display;
generate or retrieve a first image and a second image to be directed toward the first eye and the second eye, respectively, based on the relative location of the first eye and of the second eye with respect to the image plane;
for a given first segment of the first image presenting at least a part of a virtual object, determine an amount of crosstalk toward the first eye, based on at least the second image;
determine a given second segment of the second image that also presents at least said part of the virtual object;
adjust intensity values of pixels in the given second segment of the second image, based on the amount of crosstalk determined for the given first segment of the first image;
generate an autostereoscopic image using the first image and the second image; and
display the autostereoscopic image via the autostereoscopic display;
wherein a first display region and a second display region of the autostereoscopic display are employed to emit light corresponding to the given first segment of the first image toward the first eye and to emit light corresponding to the given second segment of the second image toward the second eye, respectively,
wherein the intensity values of the pixels in the given second segment of the second image are adjusted such that a binocular sum of:
(i) a luminance of the light emitted from the first segment toward the first eye,
(ii) a luminance of the light emitted from the second segment toward the second eye, and
(iii) a luminance of the crosstalk toward the first eye,
lies within a predefined threshold range of a target binocular luminance corresponding to said part of the virtual object;
wherein the binocular sum ($L_{binocular}$) is calculated using an expression:

$$L_{binocular} = \frac{L_{first}^2 + L_{second}^2}{L_{first} + L_{second}},$$

wherein: $L_{first}$ denotes a sum of (i) the luminance of the light emitted from the first segment toward the first eye and (iii) the luminance of the crosstalk toward the first eye, and
$L_{second}$ denotes (ii) the luminance of the light emitted from the second segment toward the second eye.

2. The system of claim 1, wherein the at least one processor is configured to apply a black level lift to the second image prior to adjusting the intensity values of the pixels in the given second segment of the second image.

3. The system of claim 2, wherein the black level lift is applied on a per-segment basis, and wherein a segment of the second image to which the black level lift is applied includes and surrounds the given second segment.

4. The system of claim 1, wherein the at least one processor is configured to:
for the given second segment of the second image presenting at least said part of the virtual object, determine an amount of crosstalk toward the second eye, based on at least the first image; and
adjust intensity values of pixels in the given first segment of the first image, based on the amount of crosstalk determined for the given second segment of the second image.

5. The system claim 1, wherein the at least one processor is configured to:
for the given second segment of the second image presenting at least said part of the virtual object, determine an amount of crosstalk toward the second eye, based on at least the first image; and
adjust the intensity values of the pixels in the given second segment of the second image, based further on the amount of crosstalk determined for the given second segment of the second image.

6. The system of claim 1, wherein the at least one processor is configured to:
apply a black level lift to at least the given first segment of the first image; and
adjust intensity values of pixels in the given first segment of the first image, in addition to adjusting the intensity values of the pixels in the given second segment of the second image, based on the amount of crosstalk determined for the given first segment of the first image.

7. The system of claim 1, further comprising a tracker, wherein the at least one processor configured to:

determine a gaze direction of the first eye, using the tracker; and select the given first segment of the first image, based on the gaze direction of the first eye.

8. A method comprising:

obtaining information indicative of a relative location of a first eye and of a second eye of at least one user with respect to an image plane of an autostereoscopic display;

generating or retrieving a first image and a second image to be directed toward the first eye and the second eye, respectively, based on the relative location of the first eye and of the second eye with respect to the image plane;

for a given first segment of the first image presenting at least a part of a virtual object, determining an amount of crosstalk toward the first eye, based on at least the second image;

determining a given second segment of the second image that also presents at least said part of the virtual object;

adjusting intensity values of pixels in the given second segment of the second image, based on the amount of crosstalk determined for the given first segment of the first image;

generating an autostereoscopic image using the first image and the second image; and displaying the autostereoscopic image via the autostereoscopic display;

wherein a first display region and a second display region of the autostereoscopic display are employed to emit light corresponding to the given first segment of the first image toward the first eye and to emit light corresponding to the given second segment of the second image toward the second eye, respectively, wherein the intensity values of the pixels in the given second segment of the second image are adjusted such that a binocular sum of:

(i) a luminance of the light emitted from the first segment toward the first eye, (ii) a luminance of the light emitted from the second segment toward the second eye, and (iii) a luminance of the crosstalk toward the first eye, lies within a predefined threshold range of a target binocular luminance corresponding to said part of the virtual object;

wherein the binocular sum ($L_{binocular}$) is calculated using an expression:

$$L_{binocular} = \frac{L_{first}^2 + L_{second}^2}{L_{first} + L_{second}},$$

wherein: $L_{first}$ denotes a sum of (i) the luminance of the light emitted from the first segment toward the first eye and (iii) the luminance of the crosstalk toward the first eye, and $L_{second}$ denotes (ii) the luminance of the light emitted from the second segment toward the second eye.

9. The method of claim 8, further comprising applying a black level lift to the second image prior to adjusting the intensity values of the pixels in the given second segment of the second image.

10. The method of claim 9, wherein the black level lift is applied on a per-segment basis, and wherein a segment of the second image to which the black level lift is applied includes and surrounds the given second segment.

11. The method of claim 8, further comprising:

for the given second segment of the second image presenting at least said part of the virtual object, determining an amount of crosstalk toward the second eye, based on at least the first image; and adjusting intensity values of pixels in the given first segment of the first image, based on the amount of crosstalk determined for the given second segment of the second image.

12. The method of claim 8, further comprising:

for the given second segment of the second image presenting at least said part of the virtual object, determining an amount of crosstalk toward the second eye, based on at least the first image; and adjusting the intensity values of the pixels in the given second segment of the second image, based further on the amount of crosstalk determined for the given second segment of the second image.

13. The method of claim 8, further comprising:

applying a black level lift to at least the given first segment of the first image; and adjusting intensity values of pixels in the given first segment of the first image, in addition to adjusting the intensity values of the pixels in the given second segment of the second image, based on the amount of crosstalk determined for the given first segment of the first image.

14. The method of claim 8, further comprising:

determining a gaze direction of the first eye, using a tracker; and selecting the given first segment of the first image, based on the gaze direction of the first eye.

* * * * *